United States Patent [19]

Taylor

[11] 3,912,498

[45] Oct. 14, 1975

[54] PROCESS FOR CLASS IV-B METALS ORE REDUCTION

[75] Inventor: Paul Franklin Taylor, Crossville, Tenn.

[73] Assignee: The TICOA Company, Incorporated, Crossville, Tenn.

[22] Filed: May 20, 1974

[21] Appl. No.: 471,803

Related U.S. Application Data

[63] Continuation-in-part of Ser. No. 117,098, Feb. 19, 1971, Pat. No. 3,811,871.

[52] U.S. Cl............................. 75/1; 75/10 R; 75/84; 75/97; 75/101; 75/108; 75/121
[51] Int. Cl.² C22B 1/00; C22B 34/10; C22B 4/04; C22B 3/00
[58] Field of Search............. 75/1, 121, 101, 84, 97, 75/108, 10

[56] References Cited
UNITED STATES PATENTS

| | | | |
|---|---|---|---|
| 1,593,660 | 7/1926 | Lubowsky | 75/84 |
| 1,796,170 | 3/1931 | Terwilliger | 423/21 |
| 2,617,724 | 11/1952 | Espenschied | 75/121 |
| 2,697,660 | 12/1954 | Sibert | 75/121 |
| 2,939,786 | 6/1960 | Ginsberg | 75/84 |
| 3,429,691 | 2/1969 | McLaughlin | 75/10 R |

*Primary Examiner*—P. D. Rosenberg

[57] ABSTRACT

Ores containing oxides of Titanium, Zirconium and Hafnium metals are reduced by mixing them in the powdered state with a chemical solution formula consisting primarily of phosphoric acid, zinc oxide, and a sulfated surfactant. Calcium carbonate is added to the solution as a catalyst and the mixture is brought to a boil, allowing the volatile materials to vaporize out of the mixture so as to provide either pliable or hard formed residue material. Sodium bicarbonate and water are added to the pliable which reacts chemically with waste chemicals, then is decanted and flushed with water, cleansing agents, etc. and dried. Powder may then be subjected to the plasma arc furnace so as to provide commercially pure and semi-pure powder, sponge-like ingot, or metallized upon other metal surfaces. Or the powder may be leached and cleansed of the phosphide contaminants within it and then smelted. This is accomplished by boiling it within hydroxide bases, molten halogen salts, or burning it within a mixture of hydroxide bases and sugar. Resultant material then sets in repose with added water, boiled, flushed, reacted with hydrochloric acid, again boiled with water, cleansed and rinsed with water, then dried, screened and smelted. Smelting is accomplished by plasma arc furnaces, vacuum-inert furnaces containing molten metal of the Ia or IIa Periodic Table Class groups, or vacuum-inert furnaces operating at the respective melting points of the metal. The hard formed residue is pulverized to small particle size, boiled within hydroxide bases, molten halogen salts, or burned within a mixture of hydroxide bases and sugar. Resultant material then sets in repose with added water, boiled, flushed, reacted with hydrochloric acid, again boiled with water, cleansed and rinsed with water, then dried, screened and smelted. Smelting is accomplished by plasma arc furnaces, vacuum-inert furnaces containing molten metal of the Ia or IIa Periodic Table Class groups, or vacuum-inert furnaces operating at the respective melting points of the metal.

56 Claims, No Drawings

PROCESS FOR CLASS IV-B METALS ORE REDUCTION

This application is a continuation-in-part of copending application Ser. No. 117,098, filed Feb. 19, 1971, and now U.S. Pat. No. 3,811,871.

Present invention improvements relate to more advanced and better methods for separating Class IV-B metals from chemically combined oxygen found with the ores; more specifically termed reduction, leaching, cleansing and smelting of metals within such ores; such operations herein known as Class IV-B Metals Ore Reduction Improvements. It is further improvements over the state of the art of the former TAYLOR processes for such Class IV-B ore reductions on both the copending application as well as the patented one titled *Process For Class IV-B Metals Ore Reduction Improvement*, U.S. Pat. No. 3,784,593, filed Mar. 22, 1972.

On those as well as instant process the reduced Class IV-B metal powder has attached to it a phosphide contaminant, being of the chemistry approximately $HPO_4$. Such contaminant is a polymer and creates difficulties in the smelting and refinement of the metal of which it forms a part. Instant process provides for additional steps beyond the metal ore reductions and prior to smelting so that contaminant may be eliminated. It also provides for many and varied means for smelting of the reduced material for finished metal. Such smelting methods provide both pure and semi-pure Class IV-B metal powder, pure and semi-pure sponge-like ingot material, pure and semi-pure ingot, and metal powder for other metal platings for the metallizing industry. As the Class IV-B metals are highly reactive with other elements, especially oxygen, at elevated temperatures, these contaminants must be removed prior to the smelting. The plasma arc furnace operating with vacuum-inert atmospheres is also effective in removing the phosphide contaminant trace impurities from the metal as is also the molten alkali metal furnace.

As starting materials for this improved process powdered or pulverized Class IV-B metal ore is mixed with the herein described liquid chemical solution formula, and powdered or pulverized calcium carbonate ($CaCO_3$) is added as a catalyst. The ore is either of the following types; Rutile, and the titanium ore product (titanium dioxide, $TiO_2$) as may be extracted from Ilmenite ore; Baddeleyite and the like zirconium ore product (zirconium dioxide, $ZrO_2$) as may be extracted from Zirconia Silicate; hafnium ore as included in and a part of the zirconium ore (and is chemically $HfO_2$). The liquid chemical solution formula is of composition and weight ratio as follows, and considered stoichiometrically ideal:

| | |
|---|---|
| Phosphoric acid | 24.20 lbs. more or less |
| Zinc oxide | 0.50 lb. more or less |
| Sulfated surfactant | 1.00 lb. more or less |

The sulfated surfactant is a type of wetting agent and of composition alkylphenol polyglycol ether. The powdered calcium carbonate ($CaCO_3$) should be at least 99% pure.

When the selected ore and other starting materials are mixed together within a common container and heated with endothermic heat, gases (including oxygen) are volatilized from the solution (mixture), thereby creating deficiencies of that element within certain of the solution components, which in turn creates deoxidized and dehydrated effects of those components, and by such action the evolution of the element oxygen from the ores. A phosphide contaminant polymer then attaches itself to the metal which is removed by smelting in a plasma arc furnace environment, which is vacuum-inert controlled; removed by smelting in a vacuum-inert furnace wherein exists molten metal of one of the Ia or IIa periodic table of elements classes; removed by boiling in one of the Ia or IIa periodic table of elements class hydroxides, then leaching, cleansing, and smelting; removed by boiling in one of the Ia or IIa periodic table of elements class salts, then leaching, cleansing, and smelting; or removed by burning in a mixture of one of the Ia or IIa periodic table of elements class hydroxides and sugar followed by cleansing and leaching, then smelting. Some of the smelting operations are considered as refinement.

It is, therefore, an object of the present invention improvement to provide better methods for the reduction of Class IV-B metals by the main feature of additional steps in the process for the removal of phosphide contaminant material from the reduced metal either at the time of smelting, or prior to smelting.

It is another object to provide commercially pure or semi-pure Class IV-B metal powder, sponge-like metal, ingot metal, and metal powder suitable for the metallizing industry.

It is another object to provide metal material more easier to smelt than previous by the removal of the phosphide contaminant material acquired during reduction.

It is still another object to provide means for smelting by the usage of vacuum-inert furnace environments in which molten metal of one of the Classes Ia or IIa groups exist, and which operates to usurp the phosphide contaminant material from the Class IV-B metal, thereby producing a sponge-like type of Class IV-B metal.

It is still another object to provide means for smelting by the usage of vacuum-inert furnace environments in which Class IV-B pure or impure powder is made to come into contact with the plasma arc heat or flame of the furnace to produce pure powder, pure or semi-pure ingot-like metal, and metal platings (metallizing) upon other metal.

It is still another object to provide means for smelting and refining by the usage of vacuum-inert furnace environments in which Class IV-B pure or impure powder is fed in the form of electrode rods formed of the process powders, and which is capable of degassing and operating at melting temperatures of the Class IV-B metals.

With the above and other objects in view the present invention improvements mainly comprise processes providing for the removal of phosphide contaminant material from Class IV-B metal powder after reduction by instant and previous like processes, either at the time of smelting or prior to smelting. Also, for providing commercially pure and semi-pure metal powder, sponge, ingot metal and powder for the metallizing industry. Also, for providing metal material more easier to smelt than previous. Also, for providing furnace systems of the vacuum-inert low and high temperature variety, ones containing molten alkali metal, capable of degassing, and for electrode rod melting for the smelting and refining of Class IV-B metal of instant process.

The process begins with the stated mixing together of the starting materials in a suitable reduction vessel, followed by stirring or agitating until the chemical reaction is complete and mixture well blended.

The vessel then operates within a suitable furnace environment where effective heat (endothermic) may be applied to it.

The mixture is then boiled so as to sufficiently vaporize liquid and other elements from the vessel as flue gases. Boiling is attended and enhanced by frequent stirrings with a suitable agitator. It is also attended and served by such mechanical means as necessary for collecting and venting of flue gases.

The temperature operation range throughout the boiling period is that which is necessary for maintaining a very gentle boil. Heating may be terminated while residue is yet pliable, or continued until it is hard formed, as the operator may choose.

From both types (pliable and hard formed) Class IV-B metal powder, sponge-like ingot, ingot, and powder suitable for the metallizing industry (all pure or semi-pure), are produced as the result of certain leaching, cleansing, and smelting operations herein set forth.

If the choice is for the pliable type residue heat is terminated and vessel removed from the furnace. Sufficient time for cooling is allowed and then sodium bicarbonate ($NaHCO_3$) compound is added to the residue followed by additions of water and with stirring. Certain waste chemicals will react with sodium water, go into solution, and then is decanted. Sufficient water rinsings continue until residue is sufficiently cleansed. Resulting powder may then be optionally further cleansed with certain cleansing and leaching agents as the operator may choose; such agents being acids, detergents, hydrocarbon compounds, etc.; after which powder is then carefully dried in such manner so that it will not reoxidize with component gases of the atmosphere nor result in spoiled material.

At this point powder may be subjected to several operations upon it to bring it to more usable and commercially pure metal forms. It may be injected into (1) vacuum-inert plasma arc-type furnaces operating in from 15,000° to 20,000° Farenheit heat so as to separate the metal from the phosphide contaminant polymer, thereby producing pure and semi-pure powder, ingot-like masses, or plated (metallized) upon other metal. It may be injected into (2) vacuum-inert furnaces wherein molten metal of the Classes Ia or IIa periodic table groups may or may not be utilized, to produce pure and semi-pure sponge-ingot metal. It may be boiled in molten metal hydroxides of either of the Classes Ia or IIa groups of the periodic table of elements, allowed to absorb water (hydrate), to set in repose for the time necessary for hydroxide metal and hydrogen to react with the polymer phosphide contaminant, boiled at the boiling point of water intermittenly, neutralized by adding weak hydrochloric acid, again adding water to dissolve the resultant salt forms, further boiling at the boiling point of water, decanting, flushing with water until residue metal is sufficiently cleansed, and finally drying and screening for smelting per above number 1 or 2 uses; or utilized as is for commercial grade Class IV-B metal powder. It may be mixed with one of the above listed hydroxides and sugar, then heated until ignition begins (approximately 600°–650° F), allowing burning reaction (exothermic) to go to completion, cooling, adding water and boiling to dissolve waste material, decanting, flushing with water until residue metal is sufficiently cleansed, adding weak hydrochloric acid to dissolve any hydroxide metal into solution, again flushing with water, and finally drying and screening residue metal for smelting per above number 1 or 2 uses; or utilized as is for commercial grade Class IV-B metal powder. It may be boiled in molten halogen salts of the Classes Ia or IIa groups of the periodic table of elements, allowed to absorb water (hydrate), to set in repose for the time necessary for chloride metal and hydrogen to react with the polymer phosphide contaminant, boiled at the boiling point of water intermittenly, neutralized by adding weak hydrochloric acid, again adding water to dissolve salt forms, further boiling at the boiling point of water, decanting, flushing with water until residue metal is sufficiently cleansed, and finally drying and screening for smelting per above number 1 or 2 uses; or utilized as is for commercial grade Class IV-B metal powder.

If the reduction operation choice is for a hard formed type residue heat is terminated and vessel removed from furnace. Sufficient time for cooling is allowed and then residue is removed from the reduction vessel and transported through a crushing and grinding operation sufficient to pulverize material to such size that it will react well with ingredients to be added or will easily enter a smelting furnace medium for smelting.

At this point residue metal bearing material may be subjected to several operations upon it to bring it to a more usable and commercially pure form. It may be fed into (3) a vacuum-inert furnace wherein molten metal of the Classes Ia or IIa groups of the periodic table of elements exists, to produce pure and semi-pure sponge-like metal. It may be fed into (4) a vacuum-inert furnace designed for degassing and operating at the melting points of respective Class IV-B metals to produce pure and semi-pure metal ingot. It may be boiled in molten metal hydroxides of either of the Classes Ia or IIa groups of the periodic table of elements, allowed to absorb water (hydrate), to set in repose for the time necessary for hydroxide metal and hydrogen to react with the polymer phosphide contaminant, boiled at the boiling point of water intermittenly, neutralized by adding weak hydrochloric acid, again adding water to dissolve the resultant salt forms, further boiling at the boiling point of water, decanting, flushing with water until residue metal is well cleansed, and finally drying and screening for smelting per above number 3 or 4 uses; or utilized as is for commercial grade Class IV-B metal powder. It may be mixed with one of the above listed hydroxides and sugar, then heated until ignition begins (approximately 600°–650°F.), allowing burning reaction (exothermic) to go to completion, cooling, adding water and boiling to dissolve waste material, decanting, flushing with water until residue metal is sufficiently cleansed, adding weak hydrochloric acid to dissolve any hydroxide metal into solution, again flushing with water, and finally drying and screening residue metal for smelting per above number 3 or 4 uses; or utilized as is for commercial grade Class IV-B metal powder. It may be boiled in molten metal halogen salts of the Classes Ia or IIa groups of the periodic table of elements, allowed to absorb water (hydrate), to set in repose for the time necessary for the salt metal and hydrogen to react with the polymer phosphide contaminant, boiled at the boiling point of water intermittenly, neutralized by adding weak hydrochloric acid, again adding water to dissolve salt forms, further boiling at the boiling point of water, decanting, flushing with water until residue metal is sufficiently cleansed, and finally drying and screening for smelting per above number 3 or 4 uses; or utilized as is for commercial grade Class IV-B metal powder: All may be plasma-arc smelted.

Thus, from these various processes for leaching, cleansing, and smelting of the two reduced forms of Class IV-B metal ore (pliable and hard formed) of instant and previous referenced processes, various methods for removing the phosphide contaminant material is herein established and claimed, as also the various methods for smelting and refining the freed metal to commercially pure and semi-pure metal.

Ideal hydroxides as derived from the Classes Ia and IIa metals of the periodic table of elements for instant usage are; sodium hydroxide (NaOH), potassium hydroxide (KOH), and calcium hydroxide ($Ca(OH)_2$), but not necessarily in that order. other hydrosides of the two classes also operate to some degree of efficiency.

Ideal salts as derived from the Classes Ia and IIa metals of the periodic table of elements for instant usage are; sodium chloride (NaCl), potassium chloride (KCl), magnesium chloride ($MgCl_2$), and calcium chloride ($CaCl_2$), but not necessarily in that order. Other salts of the two classes also operate to some degree of efficiency.

Ideal sugars for usage in instant processes are of the general types; Sucrose ($C_{12}H_{22}O_{11}$), Glucose ($C_6H_{12}O_6$), and Fructose ($C_6H_{12}O_6$). Starch is also usable in the form $C_6H_{10}O_5$.

Ideal hydrochloric acid for instant usage is a water diluted type. Types too strong (concentrated HCl) will react with Class IV-B metal.

OPERATIONAL EXAMPLE I — FOR TITANIUM METAL ORE REDUCTION

The operation for titanium metal ore reduction as derived from the foregoing specification may be exemplified more particularly by an explanation for the reduction of a 17-pound batch of titanium ore ($TiO_2$) which the inventor has operated successfully. Examples of other batches will not be given for this ore as many such has been reduced, and ratios of materials of all remain in like proportion.

The reduction equipment consists of the same as that used in the previous copending application (Class IV-B Metals Ore Reduction, Ser. No. 117,098, filed Feb. 19, 1971).

Introduced within the pot are 13-pounds (approximately one U.S. gallon) liquid chemical solution (Taylor formula); such solution being comprised of ingredients as described in the above specification. In addition to its wetting qualities this formula also has the property of forming passivated coatings on metallic surfaces, thereby preventing oxidation, and may (as is applied in instant process) accomplish reduction of the metallic ores provided the solution is deoxidized and dehydrated--which it is herein caused to be by boiling and the consequent volatilizing of the elements oxygen and water.

To the solution is added 17-pounds (approximately 1 U.S. gallon) of titanium ore ($TiO_2$) ground to −325 mesh.

Good stirring of the mixture at this time permits saturation by the solution of all ore particles within the batch.

Thus, the ratio by weight for this batch (and all other various and possible batches) is 13-pounds liquid chemical solution to 17-pounds of powdered ore (or approximately 1 U.S. gallon of formula to 1 U.S. gallon of −325 mesh grade titanium ore).

To this mixture is added ½-pound (approximately one cup) of limestone of approximately −100 mesh grade. This type is at least 99 percent pure calcium carbonate ($CaCO_3$).

The mixture is again stirred vigorously to aid limestone in entering the solution completely, with the chemical reaction result being the release of carbon dioxide ($CO_2$) gas. The resulting lime (CaO) enters the solution as a catalyst agent supporting reduction of the metallic oxides when the solution begins to be deoxidized and dehydrated by volatilizing (boiling).

When mixing is completed and the reaction has terminated pot is placed within the circular furnace and heat is applied from the double burners below (which is gas fired) until boiling is attained.

Stirring is necessary at this time to prevent a caking effect, with solution and ore becoming a more homogeneous mixture as the ore particles begin to swirl within the solution as it boils.

The burners are adjusted lower at this time to maintain a very gentle boil and prevent caking of the material. The flue gas collector hood-cover is positioned over the pot and is kept in that position as much as possible (notwithstanding stirring) throughout operation to allow least amounts of fume discomfort to the operator.

The boiling continues for approximately three-fourths hour with three or four stirrings at intervals during this period of time, and with inspection for process termination.

Burners are shut off when it is observed that the material has turned to black (or grey) in color, reached a thick and pliable residue, and prior to caking. Or, boiling is allowed to continue if the choice is for a hard formed residue material.

If the choice is for a thick and pliable residue approximately fifteen minutes of cooling time is allowed and then hood-cover is raised and about 2-pounds of bicarbonate of soda ($NaHCO_3$) are sprinkled on top of the residue followed by approximately 5 gallons of water, and with the pot removed from the furnace.

A chemical reaction between the component parts of the bicarbonate of soda and the unused (excess) ingredients of the solution formula transpires so as to change such ingredients to soluble salts, so such chemicals may be decanted from the pot. With some stirring and reaction terminated the mixture is allowed to settle out and the liquid decanted, being careful that powder residue is not lost. Powder is then flushed with water until it is colorless with no visible signs of dross or other impurities. It may then optionally be reacted with acids (such as hydrochloric), or other cleansing and leaching agents, followed by water rinsings until such impurities are removed.

The titanium powder is then carefully and thoroughly dried in the pot by refiring the gas burners, at which time the reduction process is terminated and the burners shut off. Care must be exercised that excessive heat is not applied to the drying powder, otherwise it will become reoxidized by atmospheric gases and be returned to its original state (TiO$_2$) and consequently spoiled.

At this stage the powder has within it a phosphide polymer contaminant of the approximate chemistry HPO$_4$. It is very dehydrated and will turn into the salt NaHPO$_4$, Na$_2$HPO$_4$, Na$_2$H$_2$PO$_4$, etc. when in the presence of Sodium and water, or Sodium and normal atmospheric water molecules. It is found that sodium hydroxide of the chemistry NaOH will cause such a transformation of the phosphide when the powder is boiled within it, thereby freeing the titanium metal from the polymer, with it becoming a soluble salt which may be easily leached and flushed out of the titanium powder. Also, it is found that when the powder is boiled within the molten sodium hydroxide and then permitted to set in repose the polymer will absorb water from the normal atmosphere and allow a better and easier separation from the titanium than if it is immediately flushed with water and hydrochloric acid. Chemistry dictates that such repose periods are necessary for the transformation of phosphoric acids from the most dehydrated forms to the other forms containing greater amounts of water, and this works to the present advantage of removing phosphide contaminant material from the reduced titanium granules.

Thus, in the present example; a vertical gas-fired circular furnace with blower, and silicon-carbide crucible is the equipment required for boiling the reduced phosphide contaminated powder as produced by instant process. The furnace operates easily at the temperature required for the boiling; approximately 1,000° to 1,200° Fahrenheit.

To three cups of sodium hydroxide two cups of the powder as produced by instant process (titanium) are added and mixed good. Mixture is added to the crucible and crucible placed within the preheated furnace. The crucible is then heated until sodium hydroxide melts and begins to boil. The heat is lowered at this time so as to maintain approximately 1,000–1,200°F. in the crucible. The boiling is kept under observance until mixture becomes noticeably thicker. Heat is terminated just before mixture becomes firm. This operation requires about a total of 30 minutes from the time crucible is first placed within the furnace. Crucible is then removed from furnace and allowed to set in repose for about 1 week (7 days). A little water is added from time to time so as to aid hydration of the phosphide polymer contaminant material within the reduced metal. The material within the crucible is boiled two or three times during this repose period. This is also to aid hydration of the polymer material and does not exceed the boiling point of water (212°F.). During the entire repose period the phosphide material will continue to absorb water (hydrate) and as it does it releases the titanium metal particles it became bound with at the reduction of the ore. The sodium of the sodium hydroxide (NaOH) combines with the polymer during the initial boil (1000°–1200°F) to become approximately Ti$_3$NaHPO$_4$ from Ti$_3$HPO$_4$. When absorbing water during the repose period it becomes 3Ti + NaH$_2$PO$_4$, or other forms such as Na$_2$H$_2$PO$_4$, etc. and is easily reacted with hydrochloric acid and water, to put it in solution, for decanting out of the presence of the titanium. However, this is only easily accomplished after the polymer material has hydrated sufficiently in the presence of some form of water and during a repose period. The sign that signifies the titanium is completely released is when all the material within the crucible has become mushy or in a thick solution with the water with no remaining chunks. At that time the material is emptied into a container in which hydrochloric acid may be added without corrosion. To the present example batch (two cups of reduced titanium powder) approximately two cups of hydrochloric acid are added and the mixture stirred good. When the visible reaction has ceased approximately one-half gallon of water is added and again the mixture is stirred good. The mixture is then boiled (212°F.) for approximately 15 minutes. It is then allowed to cool and settle a few minutes. It (the liquid) is then decanted away leaving the metal powder. Warm water is again added and the powder and water stirred, then decanted. This is repeated four or five times until all the phosphide contaminant material is removed from the metal. Metal is then dried carefully so as not to reoxidize it or pose a pyrophoric hazard, as it is now considered a commercially pure or semi-pure grade Titanium powder. It may be utilized for pressed and sintered parts, utilized in the metallizing industry with the plasma arc operation, or further refined (melted down) into ingot as required by forming into electrode rods, or feeding into alkali metal furnaces.

To one cup of sodium hydroxide are added one cup of white sugar of the chemistry C$_{12}$H$_{22}$O$_{11}$, and one cup of the powder as produced by instant process (titanium), and mixed good. Mixture is added to the crucible and crucible placed within the preheated furnace. The crucible is then heated until sodium hydroxide and sugar melts (approximately 600°–650°F.) at which it ignites and begins to burn. Furnace is allowed to heat for 2 or 3 minutes longer, then shut off. Mixture continues to burn (exothermic) briskly after furnace is shut off, and it is evident the mixture ingredients are reacting to form a combustible hydrocarbon gas in the presence of the titanium residue powder, appearing to be a form of Methane gas (CH$_4$) and/or gasoline-like (C$_6$H$_7$) or other hydrocarbon chemical unions perhaps up to the crude C$_{12}$H$_{13}$. The oxygen within the mixture components is released to feed the combustion reaction (oxidation), and so until all such materials are consumed out of the mixture. Along with this reaction the phosphide polymer contaminant (HPO$_4$) within the reduced powder releases from the metal and joins in the combustion of the other ingredients. When the reaction ceases the residue material is removed from the crucible and transported to another container wherein water (H$_2$O) is added and contents stirred good. The container is allowed to set in repose for an hour or two and then the liquid is decanted off, leaving the residue material. This is repeated three to five times with warm water until residue material is cleansed of the contaminant and waste materials. A weak form of hydrochloric acid is then added and contents again stirred good. Again it is allowed to set in repose for an hour or two and then water is added, stirred good, and decanted after it has settled out. Water is then added and mixture boiled for a few minutes at the boiling point of water. It is then decanted after it has settled out, and the water rinsings continue once or twice more after which residue powder material is then dried carefully and screened. It is now considered a commercially pure or semi-pure grade Titanium powder. It may be utilized for pressed and sintered parts, utilized in the metallizing industry with the plasma arc operation, or further refined into ingot as required by forming into electrode rods, or feeding into alkali metal furnaces.

To three cups of sodium chloride are added two cups of the powder as produced by instant process (titanium) and mixed good. Mixture is then added to the crucible and crucible placed within the preheated furnace. The crucible is then heated until salt melts and begins to boil. The heat is lowered at this time so as to maintain approximately 1600°–1700°F. in the crucible. The boiling is kept under observance until mixture becomes noticeably thicker. Heat is terminated just before mixture becomes firm. This operation requires about a total of 30 minutes from the time crucible is first placed within the furnace. Crucible is then removed from furnace and allowed to set in repose for about a week (7 days). A little water is added from time to time so as to aid hydration of the phosphide polymer contaminant material within the reduced metal. The material within the crucible is boiled two or three times during this repose period. This is also to aid hydration of the polymer material and does not exceed the boiling point of water (212°F.). During the high heat boil the polymer ursurps the sodium (Na) of the salt and the titanium particle ($Ti_3HPO_4$) becomes $Ti_3NaHPO_4$. During the repose period it ursurps water to hydrate to $3Ti + NaH_2PO_4$, and other forms of higher hydration as with the other sodium hydroxide operation. When material becomes mushy it is emptied into a corrosion-resistant container and two cups of hydrochloric acid are added and the mixture stirred good. It is then boiled (212°F.) for approximately 15 minutes after which it is allowed to cool and settle out. The liquid is then decanted away leaving the metal material. Warm water is again added and the material and water stirred, then again decanted. This is repeated four or five times until all the phosphide contaminant material is removed from the metal. To be considered is the fact that; whereas the bulk of the phosphide material ursurps the sodium of the sodium chloride, the chlorine must go somewhere, being the counterpart of the OH radical of the sodium hydroxide in the other operation which easily joins with the water molecules. Not so with the chlorine as it has affinity for joining with the titanium metal. Care must be exercised to prevent this. Cleansed and dried metal may be utilized for pressed and sintered parts, plasma arc metallizing, or further refined into ingot by forming into electrode rods, or feeding into alkali metal furnaces.

If the present example choice is for a hard formed material during the reduction approximately fifteen minutes of cooling time is allowed and then hood-cover is raised and pot removed from the furnace. The hard formed material is removed and pulverized to approximately ⅛ diameter size. Since the hard baking made the phosphide polymer more dehydrated than with the pliable finished material it will not react with the bicarbonate of soda and water as will the pliable. This type must be boiled within a bath of one of the Class Ia or IIa metal hydroxides. In instant example it is mixed by adding two cups of the pulverized residue with three cups of sodium hydroxide (NaOH).

The same gas-fired furnace and crucible are used as with the pliable type operation.

Mixture is added to the crucible and crucible placed within the preheated furnace. The crucible is then heated until sodium hydroxide melts and begins to boil. The heat is lowered at this time so as to maintain approximately 1,000°–1,200°F. in the crucible. The boiling is kept under observance until it becomes noticeably thicker. Heat is terminated just before mixture becomes firm. This operation requires about a total of 30 minutes from the time crucible is first placed within the furnace. Crucible is then removed from furnace and allowed to set in repose for about 1 week (7 days). A little water is added from time to time so as to aid hydration of the phosphide polymer contaminant material within the reduced metal as in the pliable batch operation. The material within the crucible is boiled two or three times during this repose period likewise at the boiling point of water (212°F.) so as to aid hydration of the polymer material. The water absorption (hydration) of this material progresses just as does the other operation. Again, the sign that signifies the titanium is completely released is when all the material within the crucible has become mushy or in a thick solution with the water with no remaining chunks. At this time the material is emptied into a container in which hydrochloric acid may be added without corrosion. To the present batch (two cups of reduced titanium chunks) approximately two cups of hydrochloric acid are added and the mixture stirred good. The resulting reaction is very active and should be accomplished with caution. Obviously the sodium of the hydroxide displaces the hydrogen of the hydrochloric acid and combines with the chlorine. The sodium has already attached itself chemically to the phosphide contaminant molecule, $NaHPO_4$, and so the result is the formation of a double salt of the approximate chemistry $NaCl·HPO_4$, $NaCl·H_2PO_4$, or $NaCl·NaHPO_4$ and $NaCl·NaH_2PO_4$. Since the titanium was attached to the phosphide originally of the approximate chemistry $Ti_3HPO_4$ it now disassociates itself and becomes 3 Ti while the phosphide assumes the double salt molecule and becomes completely soluble in water to be rinsed from the titanium metal. Adding of the hydrochloric acid completely frees the titanium since chlorine has greater affinity for sodium than it does for titanium. Water is then added freely to the mixture and it is boiled for appoximately fifteen minutes after which it is permitted to settle out and then is decanted leaving the metal residue. Powder is then flushed with warm water about four or five times until it is clean and free of the contaminant material. It is then dried carefully so as not to reoxidize the powder. It may then be optionally further leached with a weak solution of hydrochloric acid to as to dissolve into solution any foreign particles, sodium metal, etc., then flushed with water and dried. It may then be utilized by forming into electrode-like rods for feeding into a refining furnace where it is melted into ingot form, or may be fed into a furnace wherein molten metal of either Classes Ia or IIa groups of the periodic table of elements exists to produce pure and semi-pure sponge-like titanium metal, or it may be subjeced to the plasma arc furnace within a vacuum-inert atmosphere to produce commercially pure or semi-pure grade titanium powder, ingot-like metal, or plated upon other metal (metallizing). It may also be utilized for pressed and sintered metal parts.

To one cup of sodium hydroxide are added one cup of white sugar of the chemistry $C_{12}H_{22}O_{11}$, and one cup of the pulverized granules as produced by the instant process (hard formed material), and mixed good. Mixture is added to the crucible and crucible placed within the preheated furnace. It is then heated until sodium hydroxide and sugar melts (approximately 600°–650°F.) at which time it ignites and begins to burn. Furnace is allowed to heat for 2 or 3 minutes longer, then shut off. Mixture continues to burn (exothermic) briskly after furnace is shut off, the reaction being precisely comparable to that of the pliable residue type above. When the reaction ceases the residue material is removed from the crucible and transported to another container wherein water is added and contents stirred good. The container is allowed to set in repose for an hour or two and then the material is examined for lumps or big granules. Those present are crushed and pulverized. After settling out the waste solution is decanted and more warm water added and mixture stirred good, then again decanted. This is repeated until only the residue titanium powder remains. A weak form of hudrochloric acid is then added and contents again stirred good after which liquid is decanted. Water is again added and mixture boiled about 15 minutes. It is then decanted after settling out and then dried carefully so as not to reoxidize the powder, and screened. It is now considered a commercially pure or semi-pure grade Titanium powder. It may be utilized for pressed and sintered parts, utilized in the metallizing industry with the plasma arc furnace operation to produce powder, ingot, or metallized upon other metal, or further refined into ingot by forming into electrode rods, or feeding into alkali type (molten metal) furnaces to produce sponge-like metal.

To three cups of sodium chloride are added two cups of the pulverized granules as produced by the instant process (hard formed material), and mixed good. Mixture is added to the crucible and crucible placed within the preheated furnace. It is then heated until salt melts and begins to boil. The heat is lowered at this time so as to maintain approximately 1600°–1700°F. in the crucible. The boiling is kept under observance until mixture becomes noticeably thicker. Heat is terminated just before mixture becomes firm. This operation requires about a total of 30 minutes from the time crucible is first placed within the furnace. Crucible is then removed from furnace and allowed to set in repose for about a week (7 days). A little water is added from time to time so as to aid hydration of the phosphide polymer contaminant material within the reduced metal. The material within the crucible is boiled two or three times during this repose period. This is also to aid hydration of the polymer material and does not exceed the boiling point of water (212°F.). During this time the phosphide material will continue to absorb water (hydrate), and as it does it releases the titanium metal particles it became bound with at the reduction of the ore. This is as described for the pliable residue type above. Again, the sign that signifies the titanium is completely released is when all the material within the crucible has become mushy or in a thick solution with the water with no remaining chunks. At that time the material is emptied into a container in which hydrochloric acid may be added without corrosion. To the present example batch (two cups of reduced titanium pulverized granules) approximately two cups of hydrochloric acid are added and the mixture stirred good. When the visible reaction has ceased approximately one-half gallon of water is added and again the mixture is stirred good. The mixture is then oiled (212°F.) for approximately 15 minutes during which time the material is examined for lumps or big granules and pulverized. It is then allowed to cool and settle a few minutes. It (the liquid) is then decanted away leaving the metal powder. Warm water is again added and the powder and water stirred, then decanted. This is repeated four or five times until all the phosphide contaminant material is removed from the metal. Metal is then dried carefully so as not to reoxidize it or pose a pyrophoric hazard, as it is now considered a commercially pure or semi-pure grade Titanium powder. It may be utilized for pressed and sintered parts, utilized in the metallizing industry with the plasma arc furnace operation to produce powder, ingot, or metallized upon other metal, or further refined into ingot by forming into electrode rods, or feeding into alkali (molten metal) furnaces to produce sponge-like metal.

The calcium carbonate ($CaCO_3$) ratios for all various and possible batches for the Titanium processes are determined by the usage of about ½-pound limestone of approximately −100 mesh per 17-pounds of titanium ore sized −80 through −400 mesh.

The sodium bicarbonate ($NaHCO_3$) ratio (for flushing after the reduction boiling period) is determined for all various and possible batches for the Titanium processes by the usage of about 2-pounds per 13-pounds of liquid concentrated chemical formula utilized for reduction operations.

OPERATIONAL EXAMPLE 2.—FOR ZIRCONIUM AND HAFNIUM METAL ORE REDUCTION

The operation for zirconium and hafnium metal ore reduction as derived from the foregoing specification may be exemplified more particularly by an explanation for the reduction of a 25-pound batch of zirconium ore ($ZrO_2$), which also includes small amounts (1 −5 percent) of hafnium ore ($HfO_2$), which the inventor has operated successfully. Examples of other batch volumes will not herein be given for zirconium ore because it is found that in the reductions of all such batches the ratios of all ingredients used remain in the same like proportion as the herein given example.

The reduction equipment consists of the same as that used for Operational Example 1 for titanium ore reduction.

Introduced within the pot are 13-pounds (approximately 1 U.S. gallon) liquid chemical solution (Taylor formula); such solution being comprised of ingredients as described in the above specification, and as that used in Operational Example 1.

To the solution is added 25-pounds (approximately one U.S. Gallon) of zirconium-hafnium ore ($ZrO_2$—$HfO_2$), ground to −325 mesh.

Good stirring of the mixture at this time permits saturation by the solution of all ore particles within the batch.

Thus, the ratio by weight for this batch (and all other various and possible batches) is 13-pounds liquid chemical solution to 25-pounds of powdered ore (or approximately 1 U.S. gallon of formula to 1 U.S. gallon of −325 mesh grade ore.

To this mixture is added ½-pound (approximately one cup) of limestone of approximately −100 mesh grade. This type is at least 99 percent pure calcium carbonate ($CaCO_3$).

The mixture is again stirred vigorously to aid limestone in entering the solution completely, with the chemical reaction result being the release of carbon dioxide ($CO_2$) gas. The resulting lime (CaO) enters the solution as a catalyst agent supporting reduction of the metallic oxides when the solution begins to be deoxidized and dehydrated by volatilizing (boiling).

When mixing is completed and the reaction has terminated pot is placed within the circular furnace and heat is applied from the double burners below (which is gas fired) until boiling is attained.

Stirring is necessary at this time to prevent a caking effect, and more particularly with the zirconium ore with regard to titanium ore as the former is much heavier per unit volume than the titanium. Solution and ore becomes a more homogeneous mixture as the ore particles begin to swirl within the solution as it boils.

The burners are adjusted lower at this time to maintain a very gentle boil and prevent caking of the material. The flue gas collector hood-cover is positioned over the pot and is kept in that position as much as possible (notwithstanding stirring) throughout operation to allow least amounts of fume discomfort to the operator.

The boiling continues for approximately three-fourths hour with three or four stirrings at intervals during this period of time, and with inspection for process termination.

Burners are shut off when it is observed that the material has turned to black (or grey) in color, reached a thick and pliable residue, and prior to caking. Or, boiling is allowed to continue if the choice is for a hard formed residue material.

If the choice is for a thick and pliable residue approximately 15 minutes of cooling time is allowed and then hood-cover is raised and about 2-pounds of bicarbonate of soda ($NaHCO_3$) are sprinkled on top of the residue followed by approximately 5 gallons of water, and with the pot removed from the furnace.

A chemical reaction between the component parts of the bicarbonate of soda and the unused (excess) ingredients of the solution formula transpires so as to change such ingredients to soluble salts, so such chemicals may be decanted from the pot. With some stirring and reaction terminated the mixture is allowed to settle out and the liquid decanted, being careful that powder residue is not lost. Powder is then flushed with water until it is colorless with no visible signs of dross or other impurities. It may then be optionally reacted with acids (such as hydrochloric), or other cleansing and leaching agents, followed by water rinsings until such impurities are removed.

The zirconium-hafnium powder is then carefully and thoroughly dried in the pot by refiring the gas burners, at which time the reduction process is terminated and the burners shut off. Care must be exercised that excessive heat is not applied to the drying powder, otherwise it will become reoxidized by atmospheric gases and be returned to its original state ($ZrO_2$) and consequently spoiled.

As with the titanium ore process of Example 1 so likewise instant example powder has within it a phosphide polymer contaminant at this stage, of the approximate chemistry $HPO_4$. Also, it is very dehydrated (the polymer) and will turn into the salt $NaHPO_4$, $Na_2HPO_4$, $Na_2H_2PO_4$, etc. when in the presence of Sodium and water, or Sodium and normal atmospheric water molecules. As with the Titanium process of Example 1 it is also found in instant example for zirconium-hafnium that sodium hydroxide of the chemistry NaOH will cause such a transformation of the phosphide when the powder is boiled within it, thereby freeing the zirconium-hafnium metal from the polymer, with it (the polymer) becoming a soluble salt which may be easily leached and flushed out of the zirconium-hafnium powder. Also, too, it is found that when the powder is boiled within the molten sodium hydroxide and then permitted to set in repose the polymer will absorb water from the normal atmosphere and allow a better and easier separation from the zirconium-hafnium than if it is immediately flushed with water and hydrochloric acid. This chemistry is explained in Example 1 above.

Thus, in the present example; the same vertical gas-fired circular furnace with blower and silicon-carbide crucible as utilized in Example 1 are also utilized in instant example as the equipment required for boiling the reduced phosphide contaminated powder as produced by instant process.

To three cups of sodium hydroxide two cups of the powder as produced by instant process (zirconium-hafnium) are added and mixed good. Mixture is added to the crucible and crucible placed within the preheated furnace. The crucible is then heated until sodium hydroxide melts and begins to boil. The heat is then lowered at this time so as to maintain approximately 1,000°–1200°F. in the crucible. The boiling is kept under observance until mixture becomes noticeably thicker. Heat is terminated just before mixture becomes firm. This operation requires about a total of thirty minutes from the time crucible is first placed within the furnace. Crucible is then removed from furnace and allowed to set in repose for about a week (7 days). A little water is added from time to time so as to aid hydration of the phosphide polymer contaminant material within the reduced metal. The material within the crucible is boiled two or three times during this repose period. This is also to aid hydration of the polymer material and does not exceed the boiling point of water (212°F.). During the entire repose period the phosphide material will continue to absorb water (hydrate), and as it does it releases the zirconium-hafnium metal particles it became bound with at the reduction of the ore. As with the titanium reduction example above in instant example the sodium hydroxide (NaOH) combines with the polymer during the initial boil (1000°–1200°F.) to become approximately $Zr_3NaHPO_4$ from $Zr_3HPO_4$, or $Hf_3NaHPO_4$ from $Hf_3HPO_4$. When absorbing water during the repose period it becomes 3Zr or $3Hf + NaH_2PO_4$, or other forms such as $Na_2H_2PO_4$, etc. and is easily reacted with hydrochloric acid and water, to put it into solution, for decanting out of the presence of the zirconium-hafnium. However, this is only easily accomplished after the polymer material has hydrated sufficiently in the presence of some form of water during the repose period. The sign that signifies the zirconium-hafnium is completely released is when all the material within the crucible has become mushy or in a thick solution with the water with no remaining chunks. At that time the material is emptied into a container in which hydrochloric acid may be added without corrosion. To the present example batch (two cups of reduced zirconium-hafnium powder) approximately two cups of hydrochloric acid are added and the mixture stirred good. When the reaction has ceased approximately one-half gallon of water is added and again the mixture is stirred good. It is then boiled (212°F.) for approximately 15 minutes. It is then allowed to cool and settle a few minutes. It (the liquid)

is then decanted away leaving the metal powder. Warm water is again added and the powder and water stirred, then decanted. This is repeated four or five times until all the phosphide contaminant material is removed from the metal. Metal is then dried carefully so as not to reoxidize it or pose a pyrophoric hazard, as it is now considered a commercially pure or semi-pure grade Zirconium-Hafnium powder. It may be utilized for pressed and sintered parts, utilized in the metallizing industry with the plasma arc operation, or further refined (melted down) into ingot as required by forming into electrode rods, or by feeding into metal furnaces wherein molten alkali metal exists to produce sponge-like metal.

To one cup of sodium hydroxide are added one cup of white sugar of the chemistry $C_{12}H_{22}O_{11}$, and one cup of the powder as produced by instant process (zirconium-hafnium), and mixed good. Mixture is added to the crucible and crucible placed within the preheated furnace. The crucible is then heated until sodium hydroxide and sugar melts (approximately 600°–650°F.) at which time it ignites and begins to burn. Furnace is allowed to heat for 2 or 3 minutes longer, then shut off. Mixture continues to burn (exothermic) briskly after furnace is shut off, and it is evident the ingredients are reacting to form a combustible hydrocarbon gas in the presence of the zirconium-hafnium residue powder just as with the previous Example 1 for titanium. Along with the burning reaction the phosphide polymer contaminant ($HPO_4$) within the reduced powder releases from the metal and joins in the combustion of the other ingredients. When the reaction ceases the residue material is removed from the crucible and transported to another container wherein water ($H_2O$) is added and stirred good. The container is allowed to set in repose for an hour or two and then the liquid is decanted off, leaving the residue material. This is repeated three to five times with warm water until residue material is cleansed of the contaminant and waste materials. A weak form of hydrochloric acid is then added and contents again stirred good. Again it is allowed to set in repose for an hour or two and then water is added, stirred good, and decanted after it has settled out. Water is then added and mixture boiled for a few minutes. Liquid is then decanted after it has settled out, and the water rinsings continue once or twice more after which residue powder material is then dried carefully and screened. It is now considered a commercially pure or semi-pure grade Zirconium-Hafnium powder. It may be utilized for pressed and sintered parts, utilized in the metallizing industry with the plasma arc operation, or further refined (melted down) into ingot as required by forming into electrode rods, or by feeding into metal furnaces wherein molten alkali metal exists to produce sponge-like metal.

To three cups of sodium chloride are added two cups of the powder as produced by instant process (zirconium-hafnium) and mixed good. Mixture is then added to the crucible and crucible placed within the preheated furnace. The crucible is then heated until salt melts and begins to boil. The heat is lowered at this time so as to maintain approximately 1600°–1700°F. in the crucible. The boiling is kept under observance until mixture gets thicker. This operation requires about a total of 30 minutes from the time crucible is first placed within the furnace. Crucible is then removed from furnace and allowed to set in repose for about a week (7 days). A little water is added from time to time so as to aid hydration of the phosphide polymer contaminant material within the reduced metal. The material within the crucible is boiled two or three times during this repose period. This is also to aid hydration of the polymer material and does not exceed the boiling point of water (212°F.). During the high heat boil the polymer ursurps the sodium (Na) of the salt and the zirconium-hafnium particles ($Zr_3HPO_4$, $Hf_3HPO_4$) become $Zr_3NaHPO_4$ or $Hf_3NaHPO_4$, and other forms of higher hydration as with the above sodium hydroxide operation. When the material becomes mushy it is emptied into a corrosion-resistant container and two cups of hydrochloric acid are added and the mixture stirred good. It is then boiled (212°F.) for approximately 15 minutes after which it is allowed to cool and settle out. The liquid is then decanted away leaving the metal material. Warm water is again added and the material and water stirred, then decanted again. This is repeated four or five times until all the phosphide contaminant material is removed from the metal. Metal is then dried with care and may be utilized for pressed and sintered parts, utilized in the metallizing industry with the plasma arc operation, or further refined (melted down) into ingot as required by forming into electrode rods, or by feeding into metal furnaces wherein molten alkali metal exists to produce sponge-like metal.

If the present example choice is for a hard formed material during the reduction approximately 15 minutes of cooling time is allowed and then hood-cover is raised and pot removed from the furnace. The hard formed material is removed and pulverized to approximately ⅛ diameter size. Since the hard baking made the phosphide polymer more dehydrated than with the pliable finished material it will not react with the bicarbonate of soda and water as will the pliable. This type must be boiled within a bath of one of the Class Ia or IIa metal hydroxides. In instant example it is mixed by adding two cups of the pulverized residue with three cups of sodium hydroxide (NaOH).

The same gas-fired furnace and crucible are used as with the pliable type operation.

Mixture is added to the crucible and crucible placed within the preheated furnace. The crucible is then heated until sodium hydroxide melts and begins to boil. The heat is lowered at this time so as to maintain approximately 1,000°–1,200°F. in the crucible. The boiling is kept under observance until it becomes noticeably thicker. Heat is terminated just before mixture becomes firm. This operation requires about a total of 30 minutes from the time crucible is first placed within the furnace. Crucible is then removed from furnace and allowed to set in repose for about 1 week (7 days). A little water is added from time to time so as to aid hydration of the phosphide polymer contaminant material within the reduced metal, as in the pliable batch operation. The material within the crucible is boiled two or three times during this repose period likewise at the boiling point of water (212°F.) so as to aid hydration of the polymer material. The water absorption (hydration) of this material progresses just as does the other (pliable-residue type) above operation. Again, the sign that signifies the zirconium-hafnium is completely released is when all the material within the crucible has become mushy or in a thick solution with the water, with no remaining chunks. At this time the material is emptied into a container in which hydrochloric acid may be added without corrosion. To the present batch (two cups of reduced zirconium-hafnium chunks) approximately two cups of hydrochloric acid are added and the mixture stirred good. The resulting reaction is very active and should be accomplished with caution. Obviously the sodium of the hydroxide displaces the hydrogen of the hydrochloric acid and combines with the chlorine, as in the titanium process. The sodium has already attached itself chemically to the phosphide contaminant molecule, $NaHPO_4$, and so the result is the formation of a double salt of the approximate chemistry $NaCl \cdot HPO_4$, $NaCl \cdot H_2PO_4$, or $NaCl \cdot NaHPO_4$ and $NaCl \cdot NaH_2PO_4$. Since the zirconium-hafnium was attached to the phosphide originally of the approximate chemistry $Zr_3HPO_4$ and $Hf_3HPO_4$ it now disassociates itself and becomes 3Zr and 3Hf while the phosphide assumes the double salt molecule and becomes completely soluble in water to be rinsed from the zirconium-hafnium metal. Adding of the hydrochloric acid completely frees the zirconium-hafnium since chlorine has greater affinity for sodium than it does for zirconium-hafnium. Water is then added freely to the mixture and it is boiled for approximately 15 minutes after which it is permitted to settle out and then is decanted leaving the metal residue. Powder is then flushed with warm water about four or five times until it is clean and free of the contaminant material. It is then dried carefully so as not to reoxidize the powder. It may then be optionally further leached with a weak solution of hydrochloric acid so as to dissolve into solution any foreign particles, sodium metal, etc., then flushed with water and dried. It may then be utilized for pressed and sintered parts, utilized in the metallizing industry with the plasma arc furnace operation to produce powder, ingot, or metallized upon other metal, or further refined into ingot by forming into electrode rods, or by feeding into alkali (molten metal) furnaces to produce sponge-like metal.

To one cup of sodium hydroxide are added one cup of white sugar of the chemistry $C_{12}H_{22}O_{11}$, and one cup of the pulverized granules as produced by the instant process (hard formed material), and mixed good. Mixture is added to the crucible and crucible placed within the preheated furnace. It is then heated until sodium hydroxide and sugar melts (approximately 600°–650°F.) at which time it ignites and begins to burn. Furnace is allowed to heat for 2 or 3 minutes longer, then shut off. Mixture continues to burn (exothermic) briskly after furnace is shut off, the reaction being precisely comparable to that of the pliable residue above in both examples 1 and 2. When the reaction ceases the residue material is removed from the crucible and transported to another container wherein water is added and contents stirred good. The container is allowed to set in repose for an hour or two and then the material is examinend for lumps or big granules. Those present are crushed and pulverized. After settling out the waste solution is decanted and more warm water added and mixture stirred good, then again decanted. This is repeated until only the residue zirconium-hafnium powder remains. A weak form of hydrochloric acid is then added and contents again stirred good after which liquid is decanted. Water is again added and mixture boiled about 15 minutes. It is then decanted after settling out and then dried carefully so as not to reoxidize the powder, and screened. It is now considered a commercially pure or semi-pure grade Zirconium-Hafnium powder. It may be utilized for pressed and sintered parts, utilized in the metallizing industry with the plasma arc furnace operation to produce powder, ingot, or metallized upon other metal, or further refined into ingot by forming into electrode rods, or feeding into alkali type (molten metal) furnaces to produce sponge-like metal.

To three cups of sodium chloride are added two cups of the pulverized granules as produced by the instant process (hard formed material), and mixed good. Mixture is added to the crucible and crucible placed within the preheated furnace. It is then heated until salt melts and begins to boil. The heat is lowered at this time so as to maintain approximately 1600°–1700°F. in the crucible. The boiling is kept under observance until mixture becomes noticeably thicker. Heat is terminated just before mixture becomes firm. This operation requires about a total of 30 minutes from the time crucible is first placed within the furnace. Crucible is then removed from furnace and allowed to set in repose for about a week (7 days). A little water is added from time to time so as to aid hydration of the phosphide polymer contaminant material within the reduced metal. The material within the crucible is boiled two or three times during this repose period. This is also to aid hydration of the polymer material and does not exceed the boiling point of water (212°F.). During this time the phosphide material will continue to absorb water (hydrate), and as it does it releases the zirconium-hafnium metal particles it became bound with at the reduction of the ore. This is as described for the pliable residue types above of both examples 1 and 2. Again, the sign that signifies the zirconium-hafnium is completely released is when all the material within the crucible has become mushy or in a thick solution with the water with no remaining chunks. At that time the material is emptied into a container in which hydrochloric acid may be added without corrosion. To the present example batch (two cups of reduced zirconium-hafnium pulverized granules) approximately two cups of hydrochloric acid are added and the mixture stirred good. When the visible reaction has ceased approximately one-half gallon of water is added and again the mixturue is stirred good. The mixture is then boiled (212°F.) for approximately 15 minutes during which time the material is examined for lumps or big granules and pulverized. It is then allowed to cool and settle a few minutes. It (the liquid) is then decanted away leaving the metal powder. Warm water is again added and the powder and water stirred, then decanted. This is repeated four or five times until all the phosphide contaminant material is removed from the metal. Metal is then dried carefully so as not to reoxidize it or pose a pyrophoric hazard, as it is now considered a commercially pure or semi-pure grade Zirconium-Hafnium powder. It may be utilized for pressed and sintered parts, utilized in the metallizing industry with the plasma arc furnace operation to produce powder, ingot, or metallized upon other metal, or further refined into ingot by forming into electrode rods, or feeding into alkali (molten metal) furnaces to produce sponge-like metal.

The calcium carbonate ($CaCO_3$) ratios for all various and possible batches for the Zirconium-Hafnium processes are determined by the usage of about ½-pound limestone of approximately −100 mesh per 25-pounds of zirconium-hafnium ore sized −80 through −400 mesh.

The sodium bicarbonate ($NaHCO_3$) ratio (for flushing after the reduction boiling period) is determined for all various and possible batches for the Zirconium-Hafnium processes by the usage of about 2-pounds per 13-pounds of liquid concentrated chemical formula utilized for reduction operations.

Flushing water and other cleansing and leaching agents may have ratios for all various and possible batches in like proportion as used in the above examples (1 and 2).

Boiling and cooling periods for all various and possible batch sizes may only be determined by the operator depending upon his particular geographical location of operation. Parameters for those determinations may be indicated by the above examples (1 and 2); the operations being performed at a geographical location of 2,000 feet elevation above sea level, with atmospheric temperatures normally ranging between 40° and 80°F. With respect to such factors as atmospheric pressures and altitudes, atmospheric humidity, fuels and oxidizers used (for furnace operations), vertical and lateral dimensions of reduction equipment used, etc., clear-cut and definite statements cannot be made herein as to the standard procedures in regard thereto for all various and possible batch sizes.

CLASS IV-B METALS ORE REDUCTION IMPROVEMENT CHEMISTRY

The discussion of the chemistry involved in the above specification and examples (1 and 2) compare to that as given in the original parent application, of which instant application is a continuation-in-part, and titled Class IV-B Metals Ore Reduction, Ser. No. 117,098, filed Feb. 19, 1971. Also reference is made to later filed application, U.S. Pat. No. 3,784,593, titled Process forr Class IV-B Metals Ore Reduction (Improvement), filed Mar. 22, 1972. Also reference is made to *Smith's College Chemistry*, seventh edition, ppgs. 554–561.

What is claimed as new and desired to be secured by Letters Patent is:

1. A method of reducing titanium dioxide to titanium comprising the steps of:
    A. Adding powdered titanium dioxide to a solution consisting essentially of about 24.2 parts by weight of phosphoric acid, about 0.5 part by weight of zinc oxide, and about 1 part by weight of a sulfated surfactant,
    B. dissolving about ½-pound of calcium carbonate to every 17-pounds of titanium dioxide,
    C. bringing the solution to a boil while agitating to obtain a homogeneous solution,
    D. vaporizing the volatile materials until residue is syrupy (pliable),
    E. adding about 2-pounds of sodium bicarbonate to every 13-pounds of liquid formula used,
    F. adding water,
    G. decanting the resulting solution after the reaction has gone to completion,
    H. leaching the material in acids and water,
    I. drying the resultant residue,
    J. smelting the remaining material to produce titanium metal.

2. The process of claim 1 wherein the titanium dioxide is in the form of a rutile, and the titanium product as derived from ilmenite ore.

3. The process of claim 1 wherein sulfated surfactant is an alkylphenol polyglycol ether.

4. The process of claim 1 wherein smelting is accomplished by the utilization of a vacuum-inert plasma arc furnace environment to produce pure and semi-pure titanium powder metal, pure and semi-pure ingot metal, and metal plating upon other metals.

5. The process of claim 1 wherein smelting is accomplished by the utilization of a vacuum-inert furnace environment wherein molten metal of the Classes Ia or IIa groups exist to produce pure and semi-pure sponge-like titanium metal.

6. A method of reducing titanium dioxide to titanium comprising the steps of:
    A. Adding powdered titanium dioxide to a solution consisting essentially of about 24.2 parts by weight of phosphoric acid, about 0.5 part by weight of zinc oxide, and about 1 part by weight of a sulfated surfactant,
    B. dissolving about ½-pound of calcium carbonate to every 17-pounds of titanium dioxide,
    C. bringing the solution to a boil while agitating to obtain a homogeneous solution,
    D. vaporizing the volatile materials until residue is syrupy (pliable),
    E. adding about 2-pounds of sodium bicarbonate to every 13-pounds of liquid formula used,
    F. adding water,
    G. decanting the resulting solution after the reaction has gone to completion,
    H. leaching the material in acids and water,
    I. drying the resultant residue,
    J. leaching and cleansing residue of phosphide contaminant,
    K. re-drying, and
    L. smelting the remaining material to produce titanium metal.

7. The process of claim 6 wherein the titanium dioxide is in the form of a rutile, and the titanium product as derived from ilmenite ore.

8. The process of claim 6 wherein sulfated surfactant is an alkylphenol polyglycol ether.

9. The process of claim 6 wherein leaching and cleansing residue of phosphide contaminant is accomplished by boiling residue in molten metal hydroxides of the Classes Ia or IIa groups, allowed to absorb water, to set in repose for unspecified periods of time, boiling intermittenly, adding hydrochloric acid, again adding water, again boiling, decanting liquids, flushing with water, drying and screening.

10. The process of claim 6 wherein leaching and cleansing residue of phosphide contaminant is accomplished by mixing with metal hydroxides of the Classes Ia or IIa groups and sugar, then heating until ignition begins and goes to completion, cooling, adding water and boiling several times to dissolve waste material, decanting liquids, adding hydrochloric acid, again adding water, again boiling, decanting liquids, flushing with water, drying and screening.

11. The process of claim 6 wherein leaching and cleansing residue of phosphide contaminant is accomplished by boiling residue in molten metal halogen salts of the Classes Ia or IIa groups, allowed to absorb water, to set in repose for unspecified periods of time, boiling intermittenly, adding hydrochloric acid, again adding water, again boiling, decanting liquids, flushing with water, drying and screening.

12. The process of claim 6 wherein smelting is accomplished by the utilization of a vacuum-inert plasma arc furnace environment to produce pure and semi-pure titanium powder metal, pure and semi-pure ingot metal, and metal plating upon other metals.

13. The process of claim 6 wherein smelting is accomplished by the utilization of a vacuum-inert furnace environment wherein molten metal of the Classes Ia or IIa groups exist to produce pure and semi-pure sponge-like titaniumm metal.

14. The process of claim 6 wherein smelting is accomplished by the utilization of a vacuum-inert furnace environment wherein electrode rods formed of the process metal is fed into to produce pure and semi-pure titanium metal ingot.

15. A method of reducing titanium dioxide to titanium comprising the steps of:
  A. Adding powdered titanium dioxide to a solution consisting essentially of about 24.2 parts by weight of phosphoric acid, about 0.5 part by weight of zinc oxide, and about 1 part by weight of a sulfated surfactant,
  B. dissolving about ½-pound of calciumm carbonate to every 17-pounds of titanium dioxide,
  C. bringing the solution to a boil while agitating to obtain a homogeneous solution,
  D. vaporizing the volatile materials until residue is hard,
  E. removing residue and pulverizing,
  F. smelting the remaining material to produce titanium metal.

16. The process of claim 15 wherein the titanium dioxide is in the form of rutile, and the titanium product as derived from ilmenite ore.

17. The process of claim 15 wherein sulfated surfactant is an alkylphenol polyglycol ether.

18. The process of claim 15 wherein smelting is accomplished by the utilization of a vacuum-inert furnace environment wherein molten metal of the Classes Ia or IIa groups exist to produce pure and semi-pure sponge-like titanium metal.

19. The process of claim 15 wherein smelting is accomplished by the utilization of a vacuum-inert furnace environment designed for degassing and operating at the melting points of Class IV-B metals to produce pure and semi-pure titanium metal ingot.

20. A method of reducing titanium dioxide to titanium comprising the steps of:
  A. Adding powdered titanium dioxide to a solution consisting essentially of about 24.2 parts by weight of phosphoric acid, about 0.5 part by weight of zinc oxide, and about 1 part by weight of a sulfated surfactant,
  B. dissolving about ½-pound of calcium carbonate to every 17-pounds of titanium dioxide,
  C. bringing the solution to a boil while agitating to obtain a homogeneous solution,
  D. vaporizing the volatile materials until residue is hard,
  E. removing residue and pulverizing,
  F. leaching and cleansing residue of phosphide contaminant,
  G. drying, and
  H. smelting the remaining material to produce titanium metal.

21. The process of claim 20 wherein the titanium dioxide is in the form of rutile, and the titanium product as derived from ilmenite ore.

22. The process of claim 20 wherein sulfated surfactant is an alkylphenol polyglycol ether.

23. The process of claim 20 wherein leaching and cleansing residue of phosphide contaminant is accomplished by boiling residue in molten metal hydroxides of the Classes Ia or IIa groups, allowed to absorb water, to set in repose for unspecified periods of time, boiling intermittenly, adding hydrochloric acid, again adding water, again boiling, decanting liquids, flushing with water, drying and screening.

24. The process of claim 20 wherein leaching and cleansing residue of phosphide contaminant is accomplished by mixing with metal hydroxides of the Classes Ia or IIa groups and sugar, then heating until ignition begins and goes to completion, cooling, adding water and boiling several times to dissolve waste material, decanting liquids, adding hydrochloric acid, again adding water, again boiling, decanting liquids, flushing with water, drying and screening.

25. The process of claim 20 wherein leaching and cleansing residue of phosphide contaminant is accomplished by boiling residue in molten metal halogen salts of the Classes Ia or IIa groups, allowed to absorb water, to set in repose for unspecified periods of time, boiling intermittenly, adding hydrochloric acid, again adding water, again boiling, decanting liquids, flushing with water, drying and screening.

26. The process of claim 20 wherein smelting is accomplished by the utilization of a vacuum-inert plasma arc furnace environment to produce pure and semi-pure titanium metal, pure and semi-pure titanium powder metal, and for plating upon other metal.

27. The process of claim 20 wherein smelting is accomplished by the utilization of a vacuum-inert furnace environment wherein molten metal of the Classes Ia or IIa groups exist to produce pure and semi-pure sponge-like titanium metal.

28. The process of claim 20 wherein smelting is accomplished by the utilization of a vacuum-inert furnace environment wherein is fed electrode rods as formed by process residue metal to produce pure and semi-pure titanium metal ingot.

29. A method of reducing zirconium dioxide to zirconium and hafnium comprising the steps of:
  A. Adding powdered zirconium dioxide to a solution consisting essentially of about 24.2 parts by weight of phosphoric acid, about 0.5 part by weight of zinc oxide, and about 1 part by weight of a sulfated surfactant,
  B. dissolving about ½-pound of calcium carbonate to every 25-pounds of zirconium dioxide,
  C. bringing the solution to a boil while agitating to obtain a homogeneous solution,
  D. vaporizing the volatile materials until residue is syrupy (pliable),
  E. adding about 2-pounds of sodium bicarbonate to every 13-pounds of liquid formula used,
  F. adding water,
  G. decanting the resulting solution after the reaction has gone to completion,
  H. leaching the material in acids and water,
  I. drying the resultant residue,
  J. smelting the remaining material to produce titanium metal.

30. The process of claim 29 wherein the zirconium dioxide is in the form of baddeleyite, and the zirconium product as derived from zirconium silicate.

31. The process of claim 29 wherein sulfated surfactant is an alkylphenol polyglycol ether.

32. The process of claim 29 wherein smelting is accomplished by the utilization of a vacuum-inert plasma arc furnace environment to produce pure and semi-pure zirconium-hafnium powder metal, pure and semi-pure ingot metal, and metal plating upon other metals.

33. The process of claim 29 wherein smelting is accomplished by the utilization of a vacuum-inert furnace environment wherein molten metal of the Classes Ia or IIa groups exist to produce pure and semi-pure sponge-like zirconium-hafnium metal.

34. A method of reducing zirconium dioxide to zirconium and hafnium comprising the steps of:
   A. Adding powdered zirconium dioxide to a solution consisting essentially of about 24.2 parts by weight of phosphoric acid, about 0.5 part by weight of zinc oxide, and about 1 part by weight of a sulfated surfactant,
   B. dissolving about ½-pound of calcium carbonate to every 25-pounds of titanium dioxide,
   C. bringing the solution to a boil while agitating to obtain a homogeneous solution,
   D. vaporizing the volatile materials until residue is syrupy (pliable),
   E. adding about 2-pounds of sodium bicarbonate to every 13-pounds of liquid formula used,
   F. adding water,
   G. decanting the resulting solution after the reaction has gone to completion,
   H. leaching the material in acids and water,
   I. drying the resultant residue,
   J. leaching and cleansing residue of phosphide contaminant,
   K. re-drying, and
   L. smelting the remaining material to produce zirconium-hafnium metal.

35. The process of claim 34 wherein the zirconium dioxide is in the form of baddeleyite, and the zirconium product as derived from zirconium silicate.

36. The process of claim 34 wherein sulfated surfactant is an alkylphenol polyglycol ether.

37. The process of claim 34 wherein leaching and cleansing residue of phosphide contaminant is accomplished by boiling residue in molten metal hydroxides of the Classes Ia or IIa groups, allowed to absorb water, to set in repose for unspecified periods of time, boiling intermittenly, adding hydrochloric acid, again adding water, again boiling, decanting liquids, flushing with water, drying and screening.

38. The process of claim 34 wherein leaching and cleansing residue of phosphide contaminant is accomplished by mixing with metal hydroxides of the Classes Ia or IIa groups and sugar, then heating until ignition begins and goes to completion, cooling, adding water and boiling several times to dissolve waste material, decanting liquids, adding hydrochloric acid, again adding water, again boiling, decanting liquids, flushing with water, drying and screening.

39. The process of claim 34 wherein leaching and cleansing residue of phosphide contaminant is accomplished by boiling residue in molten metal halogen salts of the Classes Ia or IIa groups, allowed to absorb water, to set in repose for unspecified periods of time, boiling intermittenly, adding hydrochloric acid, again adding water, again boiling, decanting liquids, flushing with water, drying and screening.

40. The process of claim 34 wherein smelting is accomplished by the utilization of a vacuum-inert plasma arc furnace environment to produce pure and semi-pure zirconium-hafnium powder metal, pure and semi-pure ingot metal, and metal plating upon other metals.

41. The process of claim 34 wherein smelting is accomplished by the utilization of a vacuum-inert furnace environment wherein molten metal of the Classes Ia or IIa groups exist to produce pure and semi-pure sponge-like zirconium-hafnium metal.

42. The process of claim 34 wherein smelting is accomplished by the utilization of a vacuum-inert furnace environment wherein electrode rods formed of the process residue metal is fed into to produce pure and semi-pure zirconium-hafnium metal ingot.

43. A method of reducing zirconium dioxide to zirconium and hafnium comprising the steps of:
   A. Adding powdered zirconium dioxide to a solution consisting essentially of about 24.2 parts by weight of phosphoric acid, about 0.5 part by weight of zinc oxide, and about 1 part by weight of a sulfated surfactant,
   B. dissolving about ½-pound of calcium carbonate to every 25-pounds of zirconium dioxide,
   C. bringing the solution to a boil while agitating to obtain a homogeneous solution,
   D. vaporizing the volatile materials until residue is hard,
   E. removing residue and pulverizing,
   F. smelting the remaining material to produce zirconium-hafnium metal.

44. The process of claim 43 wherein the zirconium dioxide is in the form of baddeleyite, and the zirconium product as derived from zirconium silicate.

45. The process of claim 43 wherein sulfated surfactant is an alkylphenol polyglycol ether.

46. The process of claim 43 wherein smelting is accomplished by the utilization of a vacuum-inert furnace environment wherein molten metal of the Classes Ia or IIa groups exist to produce pure and semi-pure sponge-like zirconium-hafnium metal.

47. The process of claim 43 wherein smelting is accomplished by the utilization of a vacuum-inert furnace environment designed for degassing and operating at the melting points of Class IV-B metals to produce pure and semi-pure zirconium-hafnium metal ingot.

48. A method of reducing zirconium dioxide to zirconium and hafnium comprising the steps of:
   A. Adding powdered zirconium dioxide to a solution consisting essentially of about 24.2 parts by weight of phosphoric acid, about 0.5 part by weight of zinc oxide, and about 1 part by weight of a sulfated surfactant,
   B. dissolving about ½-pound of calcium carbonate to every 25-pounds of zirconium dioxide,
   C. bringing the solution to a boil while agitating to obtain a homogeneous solution,
   D. vaporizing the volatile materials until residue is hard,
   E. removing residue and pulverizing,
   F. leaching and cleansing residue of phosphide contaminant,
   G. drying, and H. smelting the remaining material to produce zirconium-hafnium metal.

49. The process of claim 48 wherein the zirconium dioxide is in the form of baddeleyite, and the zirconium product as derived from zirconium silicate.

50. The process of claim 48 wherein sulfated surfactant is an alkylphenol polyglycol ether.

51. The process of claim 48 wherein leaching and cleansing residue of phosphide contaminant is accomplished by boiling residue in molten metal hydroxides of the Classes Ia or IIa groups, allowed to absorb water, to set in repose for unspecified periods of time, boiling intermittenly, adding hydrochloric acid, again adding water, again boiling, decanting liquids, flushing with water, drying and screening.

52. The process of claim 48 wherein leaching and cleansing residue of phosphide contaminant is accomplished by mixing with metal hydroxides of the Classes Ia or IIa groups and sugar, then heating until ignition begins and goes to completion, cooling, adding water and boiling several times to dissolve waste material, decanting liquids, adding hydrochloric acid, again adding water, again boiling, decanting liquids, flushing with water, drying and screening.

53. The process of claim 48 wherein leaching and cleansing residue of phosphide contaminant is accomplished by boiling residue in molten metal halogen salts of the Classes Ia or IIa groups, allowed to absorb water, to set in repose for unspecified periods of time, boiling intermittenly, adding hydrochloric acid, again adding water, again boiling, decanting liquids, flushing with water, drying and screening.

54. The process of claim 48 wherein smelting is accomplished by the utilization of a vacuum-inert plasma arc furnace environment to produce pure and semi-pure zirconium-hafnium metal, pure and semi-pure zirconium-hafnium powder metal, and for plating upon other metal.

55. The process of claim 48 wherein smelting is accomplished by the utilization of a vacuum-inert furnace environment wherein molten metal of the Classes Ia or IIa groups exist to produce pure and semi-pure sponge-like zirconium-hafnium metal.

56. The process of claim 48 wherein smelting is accomplished by the utilization of a vacuum-inert furnace environment wherein is fed electrode rods as formed by process residue metal to produce pure and semi-pure zirconium-hafnium metal ingot.

* * * * *